United States Patent
Choi et al.

(10) Patent No.: US 9,540,501 B2
(45) Date of Patent: *Jan. 10, 2017

(54) WATER SWELLABLE RUBBER COMPOSITION HAVING STABLE SWELLING PROPERTY AT HIGH TEMPERATURES

(71) Applicant: ZEON CHEMICALS L.P., Louisville, KY (US)

(72) Inventors: Soobum Choi, Louisville, KY (US); Lawrence J Justice, Louisville, KY (US)

(73) Assignee: ZEON CHEMICALS L.P., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,040

(22) Filed: Jan. 14, 2013

(65) Prior Publication Data
US 2013/0274397 A1 Oct. 17, 2013

Related U.S. Application Data

(63) Continuation-in-part of application No. 13/447,611, filed on Apr. 16, 2012, now abandoned.

(51) Int. Cl.
*C08K 5/09* (2006.01)
*C09K 8/60* (2006.01)
(Continued)

(52) U.S. Cl.
CPC ............... *C08L 9/02* (2013.01); *C08L 15/005* (2013.01); *C08L 23/16* (2013.01); *C08L 33/02* (2013.01);
(Continued)

(58) Field of Classification Search
CPC ............. C08L 33/18; C08L 9/02; C08L 63/00; C08L 33/02; C08L 23/16; C08L 33/10; C08L 71/02; C08L 15/005; C08L 2205/03; E21B 33/1208
(Continued)

(56) References Cited

U.S. PATENT DOCUMENTS 4,590,227 A   5/1986   Nakamura et al.
5,293,938 A   3/1994   Onan et al.
(Continued)

FOREIGN PATENT DOCUMENTS

EP    1 978 071 A1   10/2008
JP      3111510 B2   11/2000
(Continued)

OTHER PUBLICATIONS

Nishio et al., JP 2001-123028 A machine-generated English translation, May 8, 2001.*
(Continued)

*Primary Examiner* — David Karst
(74) *Attorney, Agent, or Firm* — Westerman, Hattori, Daniels & Adrian, LLP

(57) ABSTRACT

A water swellable rubber composition comprising (a) a non-water swellable base rubber, (b) an ethylene oxide based hydrophilic elastomer having from zero up to 20 mole % of a crosslinkable curable functional group, and (c) a water swellable non-elastomeric material. The composition has excellent water swell characteristics under prolonged exposure to high temperature and various electrolyte solutions and is suitable for oil field applications. When (b) has from zero to less than 5 mole % of crosslinkable functional group, the amount of (b) is between about 30 parts and 300 parts by weight based on 100 parts by weight of (a) and the amount of (c) is between about 20 parts and 200 parts by weight based on 100 parts by weight of (a), the composition is characterized by good shape retention after undergoing
(Continued)

constrained swell, and a high degree of constrained swell at elevated temperatures in different saline concentrations.

17 Claims, 11 Drawing Sheets

(51) Int. Cl.
| | |
|---|---|
| C08L 9/02 | (2006.01) |
| C08L 33/18 | (2006.01) |
| C08L 63/00 | (2006.01) |
| C08L 33/02 | (2006.01) |
| C08L 23/16 | (2006.01) |
| C08L 33/10 | (2006.01) |
| C08L 71/02 | (2006.01) |
| C08L 15/00 | (2006.01) |
| E21B 33/12 | (2006.01) |

(52) U.S. Cl.
CPC ............... *C08L 33/10* (2013.01); *C08L 33/18* (2013.01); *C08L 63/00* (2013.01); *C08L 71/02* (2013.01); *E21B 33/1208* (2013.01); *C08L 2205/03* (2013.01)

(58) Field of Classification Search
USPC .......................... 523/130; 507/219; 524/394
See application file for complete search history.

(56) References Cited

U.S. PATENT DOCUMENTS

| | | | |
|---|---|---|---|
| 5,476,718 A * | 12/1995 | Ichizuka et al. ........... 428/424.6 |
| 5,723,551 A | 3/1998 | Brown et al. | |
| 6,281,293 B1 | 8/2001 | Fujii | |
| 6,933,339 B2 | 8/2005 | Aimura et al. | |
| 7,030,194 B1 | 4/2006 | Nakagawa et al. | |
| 7,762,329 B1 | 7/2010 | Morgan et al. | |
| 2004/0214961 A1 | 10/2004 | Gartner et al. | |
| 2008/0017376 A1* | 1/2008 | Badalamenti ........... C04B 28/02 166/292 |
| 2008/0194717 A1 | 8/2008 | Vaidya et al. | |
| 2009/0084550 A1 | 4/2009 | Korte et al. | |
| 2009/0159267 A1 | 6/2009 | Surjaatmadja | |
| 2009/0205818 A1* | 8/2009 | Klunge et al. ................. 166/179 |
| 2009/0234054 A1 | 9/2009 | Nagamori et al. | |
| 2010/0243235 A1 | 9/2010 | Caldwell et al. | |
| 2011/0028593 A1 | 2/2011 | Roddy et al. | |
| 2011/0054093 A1 | 3/2011 | Ellul et al. | |

FOREIGN PATENT DOCUMENTS

| | | | |
|---|---|---|---|
| JP | 2001-123028 A | 5/2001 | |
| JP | 2002194202 A * | 7/2002 | ............. C08L 71/00 |
| JP | 2004-12887 A | 1/2004 | |
| WO | 2010/039131 A1 | 4/2010 | |

OTHER PUBLICATIONS

Nishio, JP 2002-194202 A machine translation in English, Jul. 10, 2002.*

Notification of Transmittal of the International Search Report (PCT/ISA/220) and the Written Opinion of the International Searching Authority, or the Declaration (PCT/ISA/237), issued in International Application No. PCT/US13/36345, mailing date of Aug. 30, 2013, (10 pages).

Extended European Search Report dated Nov. 24, 2015, issued in counterpart European Patent Application No. 13778762.8 (6 pages).

Office Action dated Jun. 24, 2016, issued in counterpart Chinese patent application No. 201380020146.6 (w/ English translation, 8 pages).

\* cited by examiner

WATER SWELLABLE RUBBER COMPOSITION HAVING STABLE SWELLING PROPERTY AT HIGH TEMPERATURES

This application is a continuation-in-part of application Ser. No. 13/447,611 filed Apr. 16, 2012.

The present invention relates to a water swellable rubber (or elastomer) composition which is swellable with water or aqueous fluids, in particular saline fluids or brines.

There has been growing interest in recent years in developing water swellable elastomers, in particular for use in oil fields and similar subterranean applications. For this purpose, U.S. Pat. No. 4,590,227 discloses a homogeneous mixture of an elastomer, a water-absorbent resin and a water soluble resin. JP 3111510 B discloses a water swellable vulcanized rubber which is an ethylene oxide-propylene oxide-allyl glycidyl ether copolymer having 40-90 mole % of ethylene oxide. JP 2004-123887 discloses a water swellable vulcanizable rubber composition comprising an epichlorohydrin elastomeric polymer, a natural or synthetic rubber, and a vulcanizing agent. U.S. patent application publication No. 2009/0084550 A1 discloses a water swellable rubber composition comprising a base rubber, a cellulose component, and an acrylate copolymer.

Most oil field applications require good stability of swell and high volume swell under hostile environments, such as high electrolyte concentration, in particular electrolytes such as binary salts which are not conducive to swelling of the rubber, and high temperatures. The standard evaluations of water swellable rubber compositions for use in such hostile environments are the measurements of volume swell, weight swell and stability of swell at high temperature, at different salinity concentrations and in different electrolyte types. One aspect of the invention disclosed herein takes into consideration the fact that, in some applications such as in an oil wellbore, the element made from the rubber composition is not free (at some point during its installation or use) to swell in all directions, but its swelling is physically constrained because a portion of the surface of the rubber element is pressed against a solid surface and thus has no or little contact with water. The invention disclosed herein takes into consideration "free swell" as well as "constrained swell" of the rubber composition.

In "free swell" applications the water swellable rubber compositions disclosed in the above cited documents do not perform well under prolonged exposure to high temperature or under saline conditions. The composition according to JP 3111510 B exhibits high water absorbency at room temperature. However, with this composition it is difficult to achieve a weight swell of over 200% at a temperature above 80° C., as is required for most oil field applications. With the composition according to U.S. Pat. No. 4,590,227, after swelling at high temperature most of the water soluble resin was moved to the water phase, and the swelling capacity of the remaining rubber mixture was thus reduced. The composition according to U.S. patent application publication No. 2009-0084550 A1 has a very low swelling capacity in moderately high concentration of monovalent saline solution (3.5% NaCl) or divalent saline solution (3.5% $CaCl_2$), even at room temperature.

The present inventors worked to solve the problems above with respect to the free swell capacity of the rubber composition, i.e., low swell at high temperature, low swell even under moderately high saline conditions, and loss of swelling under prolonged exposure at high temperature. An object of the invention is to provide a water swellable rubber composition having high and sustained free swell at elevated temperatures, and high free swell under saline conditions.

The water-swellable rubber compositions disclosed in the above documents also do not perform well under constrained swell conditions in different saline environments. The composition according to JP 3111510 B exhibits high water absorbency under free swell conditions at room temperature. However, with this composition it is difficult to achieve a satisfactory constrained swell at a temperature above 80° C., as is required for most oil field applications. The composition according to U.S. Pat. No. 4,590,227 also does not achieve sufficient constrained swell for oil field applications. The composition according to U.S. patent application publication No. 2009-0084550 A1 has a very low constrained swelling capacity in moderately high concentrations of saline solution (3.5% NaCl and 6.0% NaCl), even at room temperature.

The present inventors also worked to solve the problems described above for swelling under constrained conditions, i.e., low constrained swell under low and high saline conditions, distortion or destruction of the shape of the rubber element upon swelling under constrained conditions, and low constrained swell at high temperature. An object of the invention is to provide a water-swellable rubber composition having high constrained swell with good shape retention upon swelling at elevated temperatures and under highly saline conditions.

BRIEF SUMMARY OF THE INVENTION

The above objects of the invention were achieved with a water swellable rubber composition comprising (a) a non-water swellable base rubber, (b) an ethylene oxide based hydrophilic elastomer having from zero up to and including 20 mole % of a crosslinkable curable functional group, and (c) a water swellable non-elastomeric material. In one aspect of the invention, the ethylene oxide based hydrophilic elastomer (b) has a low content from zero to less than 5 mole % of crosslinkable curable functional group, which results in a composition having a high constrained swell and satisfactory shape retention. The water swellable rubber composition may also contain a compatibilizing agent.

This water swellable rubber composition is characterized by high and sustained swelling at elevated temperature, as well as a high degree of swelling at elevated temperatures in electrolytes (saline or acidic) of different types and concentrations. The invention has overcome the problem of low swelling in multivalent salt solutions at high temperature, and the problem of loss of swelling over time at high temperature.

In the aspect of the invention where the ethylene oxide based hydrophilic elastomer (b) has a low content of crosslinkable curable functional group, the composition is characterized by satisfactory shape retention in which the structure of the rubber shape is not broken as a result of swelling, as well as a high degree of constrained swell at elevated temperatures in different saline concentrations. The inventors have overcome the problem of low constrained swell in saline solutions at high temperatures, and the problem of shape distortion or destruction after sufficient constrained swelling of the rubber composition is reached inside a space to seal that space.

DETAILED DESCRIPTION

The water swellable rubber composition of the invention comprises (a) a non-water swellable base rubber, (b) an ethylene oxide based hydrophilic elastomer having from zero up to and including 20 mole % of a crosslinkable curable functional group, and (c) a water swellable non-elastomeric material. This water swellable rubber composition is characterized by high and sustained swelling at elevated temperature, as well as a high degree of swelling at elevated temperature in electrolytes (saline or acidic) of different types and concentrations.

Figure 1A:
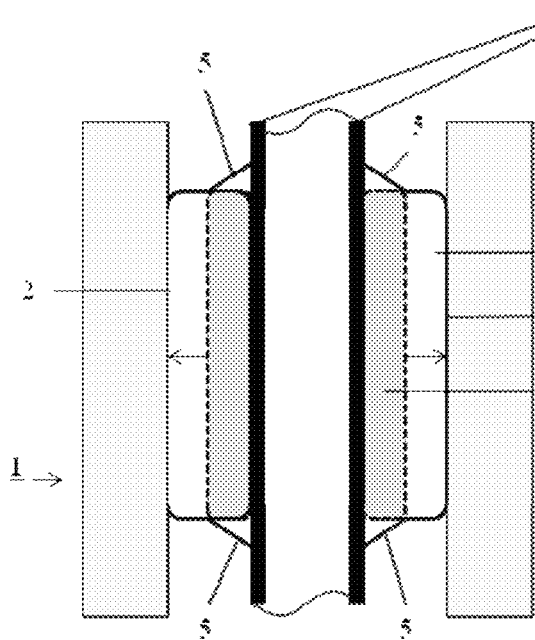
FIGS. 1A and 1B show schematically a water swellable packer arranged around a pipe inside a wellbore in a subterranean formation.
Figure 1B:
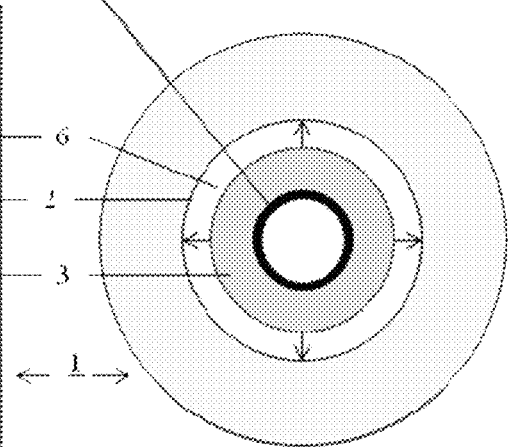
Figure 2A:
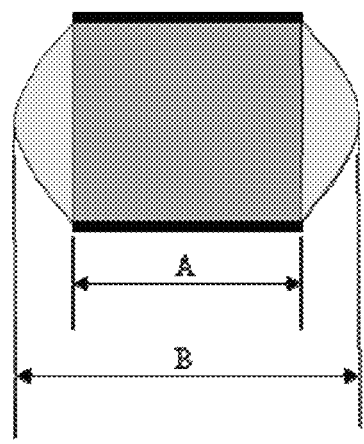
FIGS. 2A and 2B show schematically two variations of a method for measuring one-dimensional constrained swell using a constrained pipe sample.
Figure 2B:
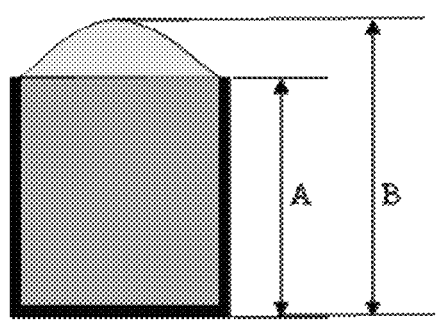

Many oil field applications require wrapping a layer of water swellable rubber (also known as a "packer") 3 around the surface of a pipe 4 (also known as a tubular) to prevent water intake into the annular space 6 between the pipe 4 and the internal wall 2 of the wellbore 1, as shown in FIGS. 1A and 1B. The two ends of the wrapped water swellable rubber are restricted by anti-extrusion rings 5. The swelling mechanism in this application is of the one-dimensional type, originating from the contact surface between the water swellable rubber and the water phase. Known water swellable rubber technology tends to focus on free swell measured with a slab type sample (1 inch×2 inches×0.08 inch) or a button type sample (1.2 inches of diameter×0.5 inch of thickness). In free swell, which is three-dimensional, the swelling rate and the swell capacity are proportional to the contact surface area. The main driving force in free swell is the osmotic pressure resulting from the ionic difference between the water swellable rubber and the solvent in contact with the swellable rubber. The performance of a swellable rubber composition under free swell conditions is not an adequate indicator of its performance under constrained swell conditions. To overcome this gap in known technology, the inventors have developed a method for measuring one-dimensional constrained swell using a constrained pipe sample as shown in FIGS. 2A and 2B.

In constrained swell, the driving force of the initial swell is the osmotic pressure between the water swellable rubber and the solvent. However, the main driving force of the continued swell is the diffusion or migration of water inside the water swellable rubber. It is understood that this diffusion or migration of water is based on the affinity between the water present in the rubber and the hydrophilic portion of the water swellable rubber.

The water swellable rubber composition in which the ethylene oxide based hydrophilic elastomer (b) has a low content of crosslinkable curable functional group of less than 5% mole ratio is characterized by good shape retention without breaking under constrained swell, as well as a high degree of constrained swelling at elevated temperatures and in different saline concentrations.

a. Non-Water Swellable Base Rubber

The non-water swellable base rubber (a) is used in the composition to provide the elastic property needed for maintaining a tight seal after swelling of the composition at elevated temperature. The base rubber also improves the processability of the water swellable rubber composition.

The base rubber (a) used in this invention may be a natural rubber (polyisoprene, more specifically cis-1,4-polyisoprene) or a synthetic rubber (which may include synthetic polyisoprene). Non-limiting examples of suitable synthetic rubber include known rubbers such as acrylonitrile-butadiene rubber (NBR), carboxylated NBR (XNBR), hydrogenated acrylonitrile-butadiene rubber (HNBR), carboxylated HNBR (HXNBR), epichlorohydrin rubber (ECO), acrylic rubber (ACM), ethylene-propylene rubber (EPDM), chloroprene rubber, butadiene rubber, styrene-butadiene rubber, fluororubber, silicone rubber, urethane rubber, and isoprene-propylene rubber. The base rubber (a) may be comprised of one rubber or a mixture of two or more rubbers.

Ethylene Oxide Based Hydrophilic Elastomer

The ethylene oxide elastomer (b) used in the composition may have at least one curable functional group recurring throughout the polymer chain and/or in side groups of the polymer chain. These occurrences of the curable functional group provide crosslinkable sites for the polymer. The monomers comprising this elastomer (b) having crosslinkable sites must include at a minimum (1) ethylene oxide; and (2) a monomer providing the mentioned crosslinkable site after polymerization with ethylene oxide. Non-limiting examples of the curable functional group are: hydroxyl, carboxyl, epoxy, amino, oxime, vinyl, oxazoline, anhydride, and amide. Ethylene oxide based hydrophilic elastomers having a carboxylic acid group or a vinyl group are commonly available and may be used as component (b) of the composition of the invention. Examples of the monomer (2) are acrylic acid, methacrylic acid, glycidyl acrylate, glycidyl methacrylate, vinyl glycidyl ether, and allyl glycidyl ether. Other glycidyl ethers bearing vinyl groups may be used, including 4-vinylcyclohexyl glycidyl ether, 4-vinylbenzyl glycidyl ether, 4-allylbenzyl glycidyl ether, ethylene glycol vinyl glycidyl ether, diethylene glycol allyl glycidyl ether, diethylene glycol vinyl glycidyl ether, triethylene glycol vinyl glycidyl ether, α-terpenyl glycidyl ether, oligoethylene glycol vinyl glycidyl ether, and oligoethylene glycol allyl glycidyl ether. Other epoxy compounds bearing vinyl groups such epoxybutene, 3,4-epoxy-1-pentene, 1,2-epoxy-5,9-cyclododecadiene, 3,4-epoxy-1-vinylcyclohexene, and 1,2-epoxy-5-cyclooctene may also be used as the monomer (2). The ethylene oxide elastomer (b) may be comprised of other monomers in addition to (1) ethylene oxide and (2) the monomer providing the crosslinkable site. The ethylene oxide elastomer (b) may be a single ethylene oxide elastomer having at least one curable functional group, or may be a mixture of two or more of such ethylene oxide elastomers having at least one curable functional group.

The elastomer (b) must contain a sufficiently high amount of ethylene oxide for the desired degree of water swell to be achieved. For many applications, an ethylene oxide content in the range of at least 65 mole %, preferably 75 mole %, is suitable.

The amount of crosslinking sites in the elastomer (b) is selected to achieve the desired properties:

(i) a higher degree of crosslinking helps to stabilize water swell under exposure to elevated temperatures;

(ii) however, if the increase in the number of crosslinking sites is accomplished by using more of the monomer having a crosslinking site and less of ethylene oxide, the reduction in ethylene oxide will be accompanied by a decrease in water swell at elevated temperatures; and (iii) no crosslinking or a low degree of crosslinking facilitates shape retention for the rubber composition under constrained swell conditions.

Based on the above understanding of the effects of the ethylene oxide content and crosslinking density, the appropriate elastomer (b) may be selected to achieve the water swell characteristics desired for specific applications. For many applications, the content of the monomer having a crosslinkable site in the elastomer (b) may be in the range of at least 0.1 mole % up to and including 20 mole %

In the aspect of the invention where the rubber composition has satisfactory shape retention under constrained swell as well as a high degree of constrained swelling at elevated temperatures in different saline concentrations, the ethylene oxide based hydrophilic elastomer (b) must have a low content of crosslinkable functional group, specifically from zero to less than 5% mole ratio of crosslinkable functional group.

Ethylene oxide terpolymers are suitable for use as the elastomer (b) in the composition of this invention. Non-limiting suitable examples are ethylene oxide-propylene oxide-allyl glycidyl ether terpolymers. These suitable terpolymers have at least 65 mole %, preferably 75 mole %, ethylene oxide and at least 0.1 mole % up to and including 20 mole % allyl glycidyl ether. If the amount of ethylene oxide is lower than 65 mole %, the degree of swelling is remarkably reduced. If the amount of crosslinkable site (from the allyl glycidyl ether) is lower than 0.1 mole %, it is very difficult to obtain stability of swelling at high temperature under conditions of free swell. Also, if the amount of the crosslinkable site is higher than 20 mole %, the relative amount of ethylene oxide is reduced so that the initial swelling rate at a temperature over 60° C. is reduced. Suitable examples of this material include, but are not limited to, terpolymers of ethylene oxide-propylene oxide-allyl glycidyl ether available from Zeon Chemicals L.P. under the names ZEOSPAN 8010 and ZEOSPAN 8030, which have a crosslinkable vinyl group in a side chain.

Ethylene oxide copolymers having at least 65 mole %, preferably 75 mole %, ethylene oxide are also suitable for use as the elastomer (b) in the composition of this invention. If the amount of ethylene oxide is lower than 65 mole %, the degree of swelling is remarkably reduced. Non-limiting suitable examples are ethylene oxide-propylene oxide copolymers. For obtaining good shape retention and high swell under constrained swell conditions, the amount of crosslinkable sites in the copolymer must be from zero to less than 5 mole % For satisfactory performance in constrained swell, it may be possible to use a combination of copolymer and terpolymer as long as the total amount of crosslinking sites is less that 5 mole % based on the total amount of ethylene oxide polymers. Suitable examples of this material include, but are not limited to, an ethylene oxide-propylene oxide copolymer available from Zeon Chemicals L.P. under the names ZEOSPAN 8100, which has a non-crosslinkable functional group, or a combination of this copolymer ZEOSPAN 8100 with the ethylene oxide-propylene oxide-ally glycidyl ether terpolymer ZEOSPAN 8030, or a combination of the ethylene oxide-propylene oxide copolymer ZEOSPAN 8100 with the ethylene oxide-allyl glycidyl ether copolymer ZEOSPAN 8010, such that the amount of crosslinkable groups is less than 5 mole % based on the total amount of ethylene oxide polymers.

Finally, homopolymers of ethylene oxide may be used as the elastomer (b).

b. Water Swellable Non-Elastomeric Material

The water swellable non-elastomeric material (c) contributes to the high volume swell at high temperature which characterizes the water swellable rubber composition according to this invention. A water swellable non-elastomeric material having at least 20 times swelling in distilled water at a temperature above 50° C. may be used as component (c). This water swellable non-elastomeric material (c) includes the materials known as "super absorbent polymer" (SAP) as well as other water swellable organic or inorganic materials. Examples of super absorbent polymers are partially neutralized polyacrylic acid sodium salt, crosslinked isoprene-maleic acid salt, starch-polyacrylic acid salt, crosslinked carboxyl methyl cellulose (CMC), and polyvinyl alcohol-acrylic acid salt. Examples of water swellable organic acid salts are sodium acetate, sodium formate, sodium acrylate, etc. Examples of water swellable inorganic materials are carbonates of sodium, potassium, lithium, calcium, and magnesium. The sodium carbonate may be used in the form of soda ash instead of pure sodium carbonate. The water swellable non-elastomeric material (c) may be a single water swellable non-elastomeric material, or may be a mixture of two or more of such water swellable non-elastomeric material.

In general, the following proportions for components (a), (b) and (c) of the water swellable rubber composition of this invention provide a good balance of swelling properties and stability at high temperature in the presence of different electrolyte types and concentrations:

(a) Non-water swellable base rubber: 100 phr
(b) Crosslinkable ethylene oxide based hydrophilic elastomer: 10-300 phr, preferably 20-250 phr, and more preferably 50-200 phr.
(c) Water swellable non-elastomeric material: 20-200 phr, preferably 30-180 phr and more preferably 50-170 phr.

For use under conditions of free swell, the following proportions are preferred:

(a) Non-water swellable base rubber: 100 phr
(b) Crosslinkable ethylene oxide based hydrophilic elastomer: 10-200 phr, preferably 20-180 phr and more preferably 50-150 phr.
(c) Water swellable non-elastomeric material: 50-200 phr, preferably 70-180 phr and more preferably 90-170 phr.

For use under conditions of constrained swell, the following proportions are preferred:

(a) Non-water swellable base rubber: 100 phr
(b) Crosslinkable ethylene oxide based hydrophilic elastomer: 30-300 phr, preferably 40-250 phr and more preferably 50-200 phr.
(c) Water swellable non-elastomeric material: 20-200 phr, preferably 30-180 phr and more preferably 50-150 phr.

Compatibility

An important consideration in the compounding of the water swellable rubber composition according to this invention is the compatibility of the base rubber (a) with the crosslinkable ethylene oxide based hydrophilic polymer (b) and the water swellable material (c). A significant factor in this compatibility is the degree of polarity of the base rubber (a) and the amount of the base rubber (a) relative to the amounts of the hydrophilic polymer (b) and the water swellable material (c). In compositions where the base rubber (a) is non-polar or is present in large quantity, the addition of a compatibilizing agent helps to produce a composition having stable water swell properties. The polarity characteristics of rubbers are known, and the inclusion of a compatibilizing agent may be based on the polarity of the base rubber used in a particular composition. Another approach in determining whether to use a compatibilizing agent is to prepare a test mixture of the three components (a), (b) and (c). If it is evident from visual observation of the mixture that the rubber (a) is not sufficiently blended with components (b) and (c), for example when there is visible phase separation, then a compatibilizing agent may be added.

In general, when a compatibilizing agent is used, its amount should be no more than 40 phr for 100 phr of non-water swellable base rubber (a). In many compositions an amount of no more than 30 phr of the compatibilizing agent for 100 phr of base rubber is suitable.

With respect to compatibility with the crosslinkable ethylene oxide based hydrophilic polymer (b), hydrogenated acrylonitrile-butadiene rubber (HNBR) and epichlorohydrin rubber (ECO) are particularly suitable as the base rubber (a), and may be compounded without a compatibilizing agent. A water swellable non-elastomeric material (c) particularly suitable for use with HNBR or ECO is a super absorbent polymer based on partially neutralized polyacrylic acid sodium salt. The resulting composition is characterized by a high degree of swelling and stability of swelling derived from the internal compatibility among its components at high temperature in different electrolyte types and at different electrolyte concentrations.

Compatibilizing agents which may be used in the water swellable rubber composition of this invention are materials having both polar and non-polar moieties in their molecules. A single compatibilizing agent or a mixture of two or more compatibilizing agents may be used. Examples of such materials having both polar and non-polar moieties are aromatic triesters, monoesters of tricarboxylic acids, and diesters. The diesters may be aliphatic or aromatic diesters, or they may be diesters of: a dialkyl ether, a polyglycol, or an alkyl alkylether. Examples of suitable compatibilizing agents for use in the water swellable rubber composition of this invention are trioctyl trimellitate, ditridecyl adipate, and dialkyl diether glutarate. The plasticizers PLASTHALL TOTM and PLASTHALL DTDA, both available from Hallstar, are examples of compatibilizing agents which may be used in this invention.

Additives

The water swellable rubber composition according to the invention may be formulated to include additives suitably selected by one of ordinary skill in the art, which may include but are not limited to fillers, curing agents, activators, retarders, accelerators, antioxidants, antiozonants, processing aids, etc.

Various fillers such as carbon black, silica, clays, calcium carbonate, bentonite and other filler material may be used, alone or in combination with one or more other filler. The amount of filler is not specifically restricted and may be selected readily by one of ordinary skill in this art. A suitable range for many applications is from 3 to 100 phr.

A variety of curatives or curing agents may be used, such as a sulfur type curing package or a peroxide type curing package, with their respectively preferred accelerators. The amount of curatives and their accelerators may be in the range from 0.05 to 5.0 phr.

Examples of suitable activators include zinc oxide (ZnO), zinc stearate, stearic acid, magnesium oxide (MgO) and combinations thereof. The amount of activators may be in the range from 1 to 10 phr.

Examples of suitable antioxidants include any of the phenyl amines (e.g. NAUGARD type, NOCRAC type, AGERITE type) and any of the mercaptobenzimidazoles (e.g. VANOX type). The amount of antioxidant may be in the range from 0.1 to 5.0 phr.

Processing aids may be used in the range from 0.1 to 20 phr.

Processing

The addition, blending or compounding of all components of the composition of the invention may be carried out with conventional equipment, for example a mill and/or a Brabender mixer or other internal mixer. Curing conditions such as cure temperature and cure time may be selected according to conventional practice in rubber technology.

The water swellable rubber composition of the invention exhibits good stability and improved volume swell at high temperature, in different electrolyte types and at different electrolyte concentrations, compared with conventional water swellable rubber compositions.

The following examples further illustrate aspects of the invention but do not limit the invention. Unless otherwise indicated, all parts, percentages, ratios, etc., in the Examples, Comparative Examples and in the rest of the specification are in terms of weight.

Free Swell

The degree of free swell in the Examples and Comparative Examples is defined and measured as follows:

Degree of free swell=$(B-A)/A \times 100$ (wt %)

wherein A: weight before swelling.
B: weight after swelling.

The size of a sample affects the measurement of the initial swelling, which depends on the surface area of the contact with water. In the free swell tests reported for this invention, the sample is a slab type sample (1 inch width×2 inches length×0.08 inch thickness) unless otherwise indicated.

Constrained Swell

The degree of constrained swell in the Examples and Comparative Examples was measured as follows. A pipe of 1 inch diameter was filled completely from end to end with the swellable rubber composition and immersed in the test solution.

Length of pipe: 1 inch for testing in 6-12% NaCl solutions
1.5 inch for testing in 3.5% NaCl solution For measuring constrained swell in saline concentrations, both ends of the pipe were open. As illustrated in FIG. 2A, the total growth in constrained swell of the pipe sample is the difference in the measurements A and B.

Total growth in constrained swell from both sides=B−A (inches)

wherein A: length of rubber sample in pipe before constrained swelling

B: length of rubber sample measured between the points of maximum extension at each end of the sample after constrained swelling.

As shown in FIG. 2B, a variation of this test was used in testing for constrained swell in tap water. The swelling in tap water was so large that the swollen rubber sample was pulled out of one end the pipe and the extended length of the sample could not be measured accurately. Therefore, the measurement was made with one end of the pipe being closed, leaving only one open end from which the swollen rubber extended beyond the pipe. For the purpose of comparison with the results of constrained swell measured with both ends of the pipe open, the growth obtained with this modified method was multiplied by 2 to adjust the results for testing with only one end of the pipe open.

Total growth in constrained swell=(B−A)×2 (inches)

wherein A: length of rubber sample in pipe before constrained swelling.

B: length of rubber sample measured from closed end of pipe to point of maximum extension of rubber sample at open end of pipe after constrained swelling.

Free Swell

Example 1

Figure 3:
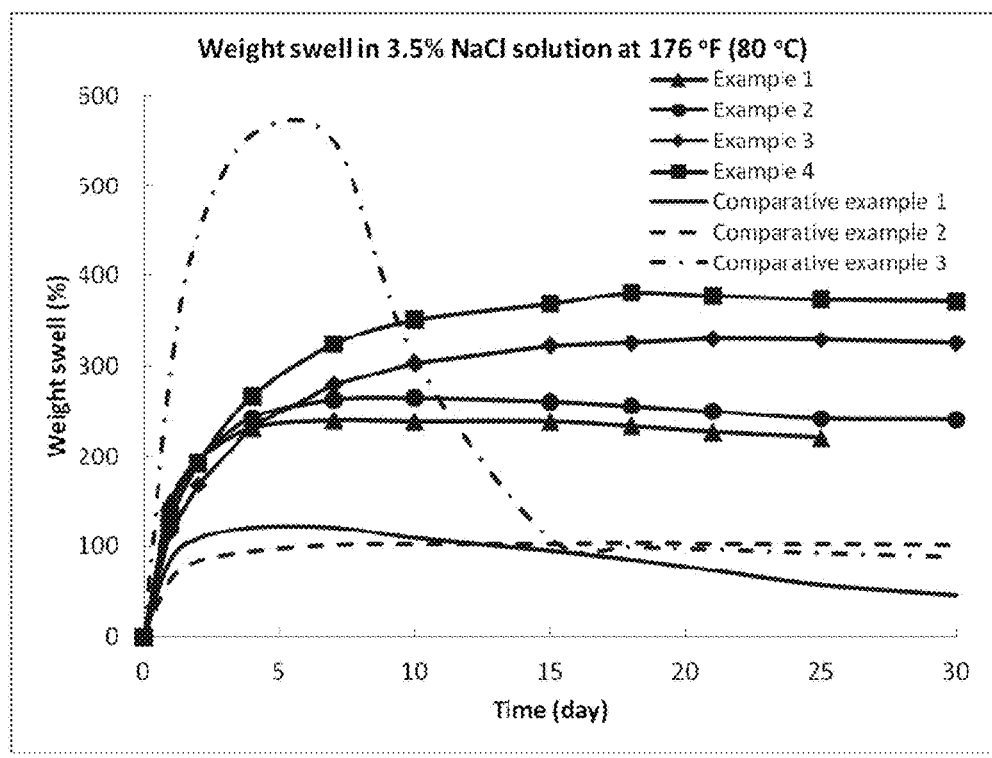
FIG. 3 is a graph of % weight increase over 30 days of free swell for the compositions of Example 1-Example 4 and Comparative Example 1-Comparative Example 3 in 3.5% NaCl solution at 176° F. (80° C.).

In this example the non-water swellable base rubber is a hydrogenated acrylonitrile-butadiene rubber (ZETPOL 2020EP from Zeon Chemicals LP). The ethylene oxide based hydrophilic elastomer having a curable functional group is ZEOSPAN 8030 (from Zeon Chemicals LP). The water swellable non-elastomeric material is a partially neutralized/crosslinked polyacrylic acid sodium salt (AQUA KEEP 10SH-NF: Sumitomo Seika Chemicals Co. Ltd.). Other components are shown in Table 1. These components were blended in a 270 mL Brabender bowl at 70° C. for 15 minutes without curing agent or accelerator. The curing agent and accelerator shown in the table were added during the mill process under cooling. After measuring with MDR 2000 at 100 cpm 0.5° arc for 45 minutes at 160° C., curing was carried out at 160° C. for 15 minutes. To measure the degree of swelling in different electrolyte types and concentrations at different temperatures, button type samples (1 inch diameter×0.5 inch thickness) were made and tested. The results are shown in FIG. 3.

Example 2

The composition of Example 2 was prepared according to the same procedure as in Example 1 except that PLAST-HALL 7050 was added. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIG. 3.

Example 3

The composition of Example 3 was prepared according to the same procedure as in Example 1 except that PLAST-HALL TOTM was added. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIG. 3.

Example 4

Figure 4:
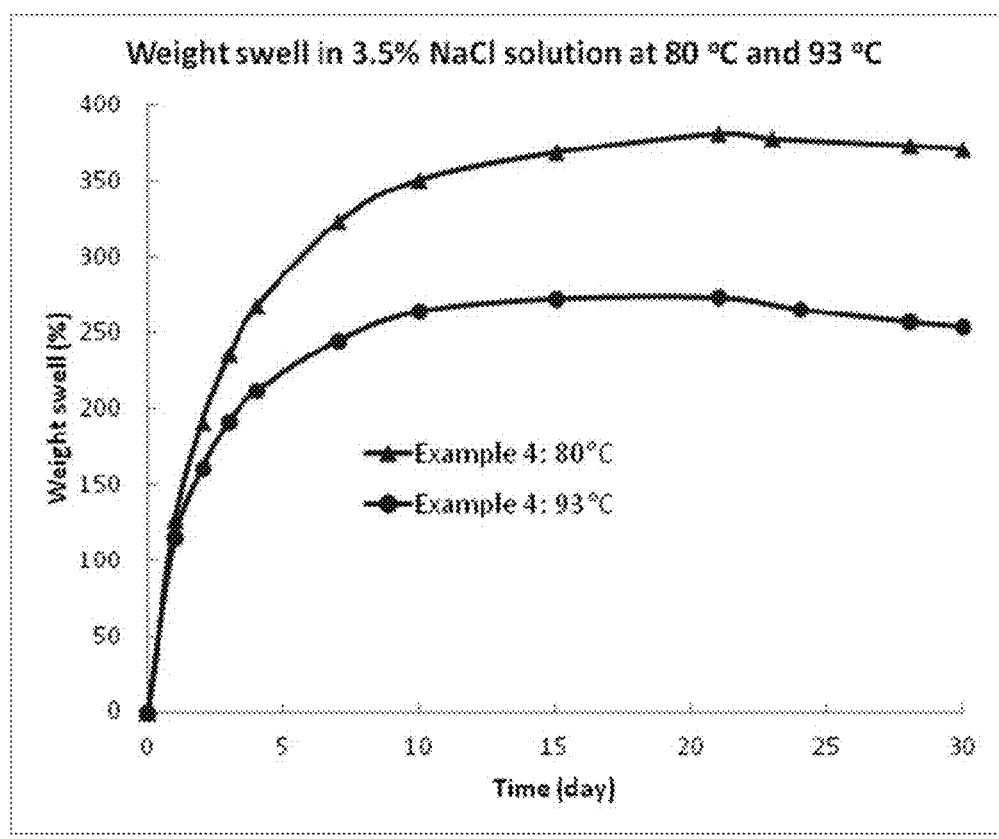
FIG. 4 is a graph of % weight increase over 30 days of free swell for the composition of Example 4 in 3.5% NaCl solution at 176° F. (80° C.), and also at 200° F. (93° C.).
Figure 5:
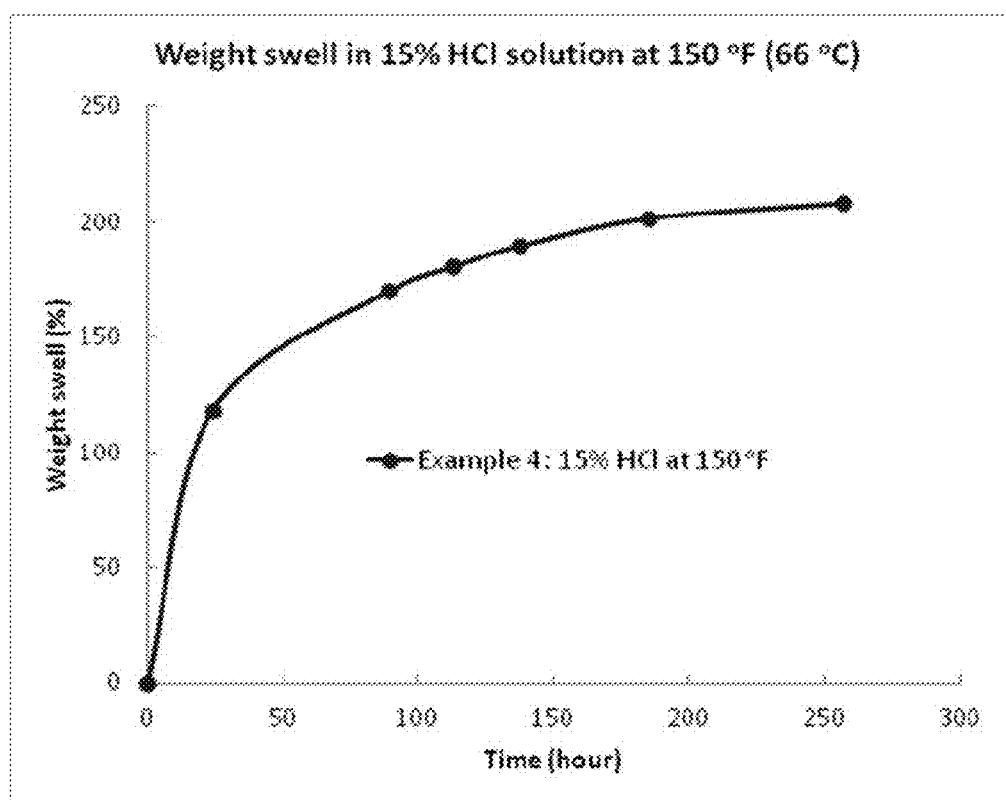
FIG. 5 is a graph of % weight increase over 260 hours of free swell for the composition of Example 4 in 15% HCl solution at 150° F. (66° C.).

The composition of Example 4 was prepared according to the same procedure as in Example 1 except that PLAST-HALL DTDA was added. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIGS. 3, 4 and 5.

Example 5

Figure 6:
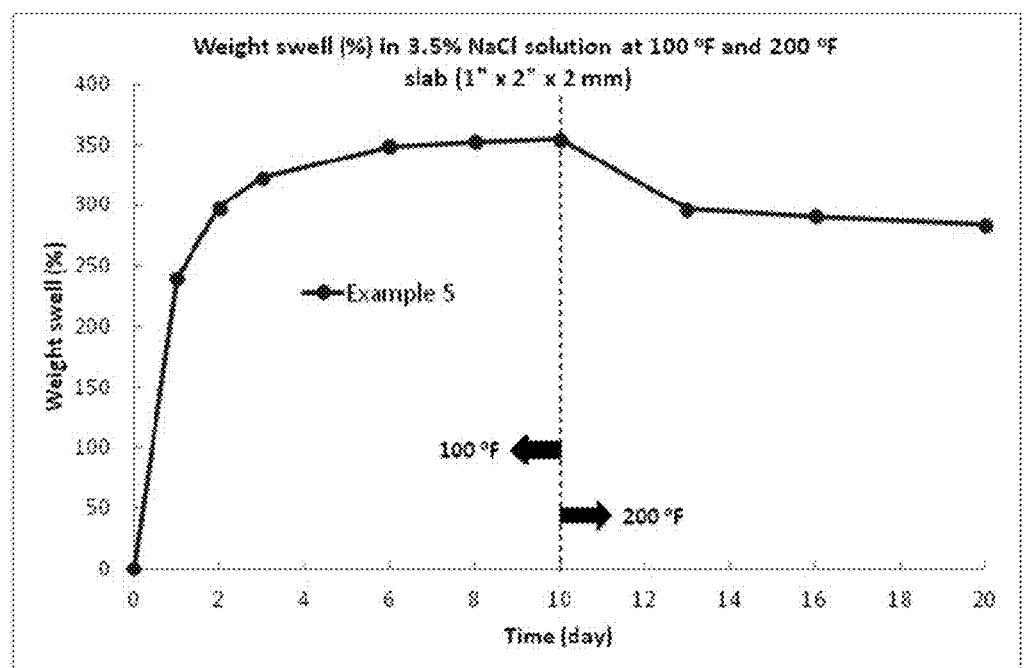
FIG. 6 is a graph of % weight increase for the composition of Example 5 in 3.5% NaCl solution over 10 days of free swell at 100° F. (38° C.), followed by 10 days of free swell at 200° F. (93° C.).

The composition of Example 5 was prepared according to the same procedure as in Example 4 except that a peroxide cure agent (DI-CUP 40c) and an accelerator (MBM) suitable for a peroxide cure system were used instead of sulfur and accelerators suitable for a sulfur cure system (OBTS, TMTD, and TETD). All components and their amounts are shown in Table 1. After measuring MDR 2000 at 160° C., a slab (5.88 inches×5.88 inches×0.08 inch) of the composition was cured for 22 minutes at 160° C. To measure the degree of swelling in 3.5% NaCl solution at 100° F. and 200° F., slab type specimens (1 inch×2 inch×0.08 inch) were cut from the cured slab and tested. The results are shown in FIG. 6.

Comparative Example 1

The composition of Comparative Example 1 was prepared according to the same procedure as in Example 2 except that ZEOSPAN 8030 was omitted. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIG. 3.

Comparative Example 2

The composition of Comparative Example 2 was prepared according to the same procedure as in Example 2 except that ZETPOL 2020EP and SAP were omitted. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIG. 3.

Comparative Example 3

The composition of Comparative Example 3 was prepared according to the same procedure as in Example 2, except that ZETPOL 2020EP was omitted. All components and their amounts are shown in Table 1. To measure the degree of swelling in different electrolyte types, at different electrolyte concentrations and at different temperatures, button type samples (1 inch diameter×0.5 inch thickness) were made and tested. The results are shown in FIG. 3.

TABLE 1

| Ingredient | Example 1 (phr) | Example 2 (phr) | Example 3 (phr) | Example 4 (phr) | Example 5 (phr) | Comparative Example 1 (phr) | Comparative Example 2 (phr) | Comparative Example 3 (phr) |
|---|---|---|---|---|---|---|---|---|
| ZETPOL 2020EP[a] | 100.0 | 100.0 | 100.0 | 100.0 | 100.0 | 100.0 | | |
| ZEOSPAN 8030[b] | 93.0 | 93.0 | 93.0 | 93.0 | 93.0 | | 100.0 | 100.0 |

TABLE 1-continued

| Ingredient | Example 1 (phr) | Example 2 (phr) | Example 3 (phr) | Example 4 (phr) | Example 5 (phr) | Comparative Example 1 (phr) | Comparative Example 2 (phr) | Comparative Example 3 (phr) |
|---|---|---|---|---|---|---|---|---|
| SAP[c] | 164.0 | 164.0 | 164.0 | 164.0 | 164.0 | 185.7 | | 122.2 |
| PLASTHALL 7050[d] | | 5.4 | | | | 9.1 | 3.2 | 7.1 |
| PLASTHALL TOTM[e] | | | 21.0 | | | | | |
| PLASTHALL DTDA[f] | | | | 21.0 | 21.0 | | | |
| N550[g] | 21.4 | 21.4 | 21.4 | 21.4 | 21.4 | 28.6 | 3.9 | 13.3 |
| MgO | 0.4 | 0.4 | 0.4 | 0.4 | 0.4 | | 0.1 | |
| AGERITE RESIN D[h] | 1.8 | 1.8 | 1.8 | 1.8 | 1.8 | 1.4 | 0.4 | 1.1 |
| Stearic acid | 1.8 | 1.8 | 1.8 | 1.8 | 1.8 | 1.4 | 0.4 | 1.1 |
| KADOX 920c[i] | 5.7 | 5.7 | 5.7 | 5.7 | 5.7 | 4.3 | 1.1 | 4.0 |
| Spider Sulfur | 0.4 | 0.4 | 0.4 | 0.4 | | 0.3 | 0.1 | 0.2 |
| OBTS[j] | 1.8 | 1.8 | 1.8 | 1.8 | | 1.4 | 0.4 | 1.1 |
| TMTD[k] | 1.8 | 1.8 | 1.8 | 1.8 | | 1.4 | 0.4 | 1.1 |
| TETD[l] | 1.8 | 1.8 | 1.8 | 1.8 | | 1.4 | 0.4 | 1.1 |
| DI-CUP 40c[m] | | | | | 3.9 | | | |
| VANOX MBM[n] | | | | | 3.6 | | | |
| TOTAL | 399.3 | 399.3 | 414.9 | 414.9 | 423.6 | 335.0 | 117.4 | 252.3 |

[a]ZETPOL 2020EP: hydrogenated nitrile rubber having 36% of acrylonitrile and 91% of hydrogenation (Zeon Chemicals LP)
[b]ZEOSPAN 8030: ethylene oxide-propylene oxide-allyl glycidyl ether terpolymer having 91% of ethylene oxide and 6 mole % of allyl glycidyl ether (Zeon Chemicals LP)
[c]SAP: a partially neutralized/crosslinked polyacrylic acid sodium salt (Aqua Keep 10SH-NF: Sumitomo Seika Chemicals Co. Ltd)
[d]PLASTHALL 7050: dialkyl diether glutarate (The Hallstar company)
[e]PLASTHALL TOTM: trioctyl trimellitate (The Hallstar company)
[f]PLASTHALL DTDA: ditridecyl adipate (The Hallstar company)
[g]N550: carbon black (Cabot Corporation)
[h]AGERITE RESIN D: antioxidant (polymerized 1,2-dihydro-2,2,4-trimethylquinoline, from R. T. VANDERBILT COMPANY, IN)
[i]KADOX 920c: Zinc Oxide Active (Horsehead Corp.)
[j]OBTS: N-oxydiethylene-2-benzothiazole sulfenamide (accelerator of sulfur: Akrochem Corp.)
[k]TMTD: tetramethylthiuram disulfide (accelerator of sulfur: Akrochem Corp.)
[l]TETD: tetraethylthiuram disulfide (accelerator of sulfur: Akrochem Corp.)
[m]DI-CUP 40c: Dicumyl peroxide on a carrier of calcium carbonate (Arkema)
[n]VANOX MBM: m-phenylenedimaleimide (R. T. Vanderbilt Company, Inc.)

As seen in FIG. 3, compositions according to the invention (Examples 1-4) showed improved free swell (by weight) in 3.5% NaCl solution that did not deteriorate with time over the duration of the test (30 days). In contrast, the composition of Comparative Example 1 (lacking the ethylene oxide elastomer) and the composition of Comparative Example 2 (lacking the water swellable non-elastomeric material) had consistently lower free swell over the duration of the test. The composition of Comparative Example 3 (lacking the non-water swellable rubber) showed a remarkable increase in free swell during the first five days of the test, but this free swell declined to the same level as for Comparative Example 1 and Comparative Example 2 after 15 days of testing.

FIG. 4 shows that the free swell (by weight) for the composition of Example 4 according to the invention remained consistently high even towards the end of the 30-day test, and even when measured at a higher temperature of 93° C. A similar performance was exhibited by the composition of Example 4 when tested in 15% HCl solution, as shown in FIG. 5.

Finally, FIG. 6 shows that the free swell (by weight) for the composition of Example 5 did not drop greatly after exposure for ten days at 100° F. when the temperature was increased to 200° F. for another ten days.

Constrained Swell

Example 6

In this example the non-water swellable base rubber is a hydrogenated acrylonitrile-butadiene rubber (ZETPOL 2020EP from Zeon Chemicals LP). The ethylene oxide based hydrophilic elastomer having no curable functional group is ZEOSPAN 8100 (from Zeon Chemicals LP). The water-swellable non-elastomeric material is a partially neutralized/crosslinked polyacrylic acid sodium salt (AQUA KEEP 10SH-NF: Sumitomo Seika Chemicals Co. Ltd.). Other components are shown in Table 2. These components were blended in a 270 mL Brabender bowl at 70° C. for 15 minutes without curing agent or accelerator. The curing agent and accelerator shown in the table were added during the mill process under cooling. After measuring with MDR 2000 at 100 cpm 0.5° arc for 45 minutes at 160° C., curing was carried out at 160° C. for 15 minutes. To measure the degree of constrained swelling in different electrolyte concentrations at different temperatures, pipe samples (1 inch diameter×1 inch length) were made and tested. The results are shown in FIGS. 7-11.

Example 7

The composition of Example 7 was prepared according to the same procedure as in Example 6, except that the amount of ZEOSPAN 8100 was changed from 100 phr to 50 phr. All components and their amounts are shown in Table 2. To measure the degree of constrained swell in different electrolyte concentrations at different temperatures, pipe samples (1 inch diameter×1 inch length) were made and tested. The results are shown in FIG. 7-11.

Comparative Example 4

The composition of Comparative Example 5 was prepared according to the same procedure as in Example 6 except that ZEOSPAN 8010 was used instead of ZEOSPAN 8100. All components and their amounts are shown in Table 3. To measure the degree of constrained swelling in different electrolyte concentrations at different temperatures, pipe samples (1 inch diameter×1 inch length) were made and tested. The results are shown in FIG. 7-11.

Comparative Example 5

The composition of Comparative Example 6 was prepared according to the same procedure as in Example 6, except that the amount of ZEOSPAN 8100 was changed from 100 phr to 10 phr. All components and their amounts are shown in Table 3. To measure the degree of constrained swelling in different electrolyte concentrations at different temperatures, pipe samples (1 inch diameter×1 inch length) were made and tested. The results are shown in FIG. 7-11.

TABLE 2

Examples (constrained swell tests)

| Ingredients | Example 6 | Example 7 |
|---|---|---|
| ZETPOL 2020EP[a] | 100.0 | 100.0 |
| ZEOSPAN 8100[b] | 100.0 | 50.0 |
| ZEOSPAN 8010[c] | | |
| SAP[d] | 100.0 | 100.0 |
| PLASTHALL DTDA[e] | 15.0 | 15.0 |
| N550[f] | 40.0 | 40.0 |
| Maglite D[g] | 0.5 | 0.5 |
| AGERITE RESIN D[h] | 1.5 | 1.5 |
| KADOX 920C[i] | 4.0 | 4.0 |
| Di-CUP 40KE[j] | 4.0 | 4.0 |
| VANOX MBM[k] | 2.5 | 2.5 |
| Total | 367.5 | 317.5 |

TABLE 3

Comparative Examples (constrained swell tests)

| Ingredients | Comparative Example 4 | Comparative Example 5 |
|---|---|---|
| ZETPOL 2020EP[a] | 100.0 | 100.0 |
| ZEOSPAN 8100[b] | | 10.0 |
| ZEOSPAN 8010[c] | 100.0 | |
| SAP[d] | 100.0 | 100.0 |
| PLASTHALL DTDA[e] | 15.0 | 15.0 |
| N550[f] | 40.0 | 40.0 |
| Maglite D[g] | 0.5 | 0.5 |
| AGERITE RESIN D[h] | 1.5 | 1.5 |
| KADOX 920C[i] | 4.0 | 4.0 |
| Di-CUP 40KE[j] | 4.0 | 4.0 |
| VANOX MBM[k] | 2.5 | 2.5 |
| Total | 367.5 | 277.5 |

[a]ZETPOL 2020EP: hydrogenated nitrile rubber having 36% of acrylonitrile and 91% of hydrogenation (Zeon Chemicals LP)
[b]ZEOSPAN 8100: ethylene oxide-propylene oxide copolymer having 90% of ethylene oxide (Zeon Chemicals LP)
[c]ZEOSPAN 8010: ethylene oxide- allyl glycidyl ether copolymer having 13% of allyl glycidyl ether (Zeon Chemicals LP)
[d]SAP: a partially neutralized/crosslinked polyacrylic acid sodium salt (Aqua Keep 10SH-NF; Sumitomo Seika Chemicals Co. Ltd)
[e]PLASTHALL DTDA: ditridecyl adipate (The Hallstar company)
[f]N550: carbon black (Cabot Corporation)
[g]Maglite D: Magnesium Oxide (C.P. Hall Company)
[h]AGERITE RESIN D: antioxidant (polymerized 1,2-dihydro-2,2,4-trimethylquinoline, from R. T. VANDERBILT COMPANY, IN)
[i]KADOX 920c: Zinc Oxide Active (Horsehead Corp.)
[j]DI-CUP 40KE: Dicumyl peroxide in a clay carrier (Arkema Inc.)
[k]VANOX MBM: m-phenylenedimaleimide (R. T. Vanderbilt Company, Inc.)

Figure 7:
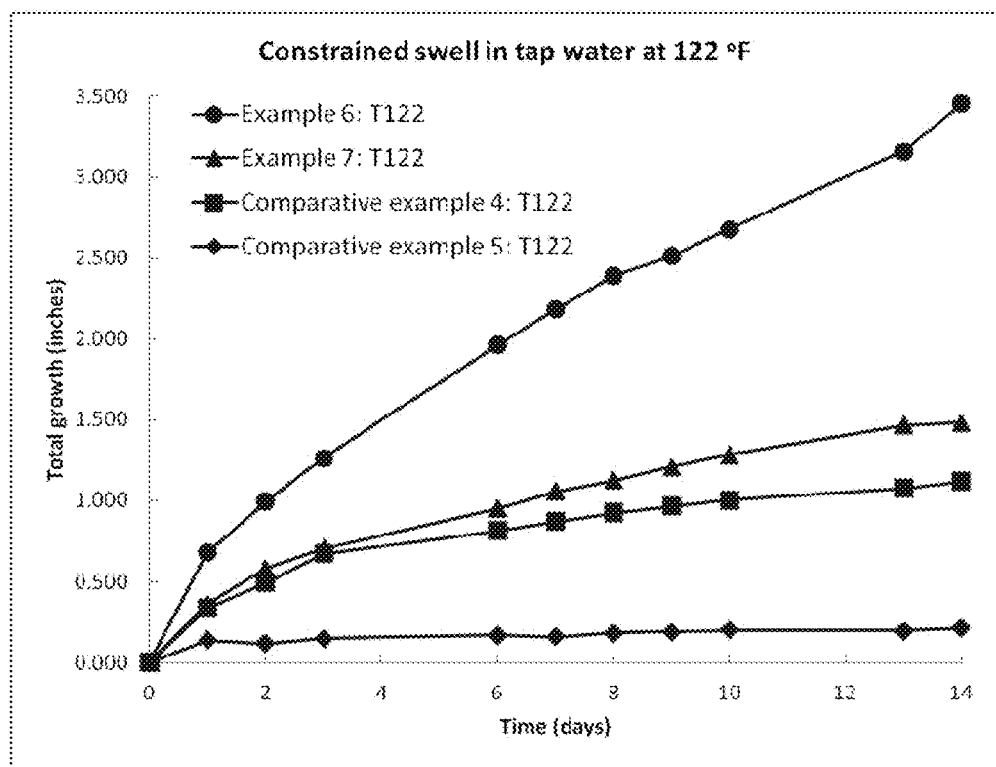
FIG. 7 is a graph of constrained swell over 14 days for the compositions of Example 6-Example 7 and Comparative Example 4-Comparative Example 5 in tap water at 122° F. (50° C.).
Figure 8:
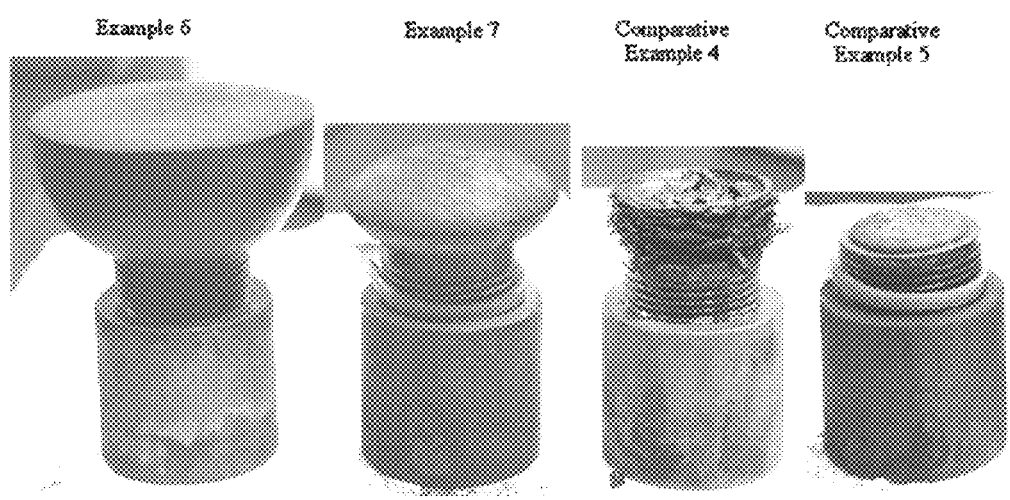
FIG. 8 shows photographs of constrained swell shapes for the compositions of Example 6-Example 7 and Comparative Example 4-Comparative Example 5 in tap water at 122° F. (50° C.) after 14 days.

As seen in FIG. 7, Example 6 showed highly improved constrained swell in tap water over the duration of the test (14 days). The compositions of Example 7 and Comparative Example 4 both showed improved constrained swell in tap water over the duration of the test (14 days). However, the sample of Comparative Example 4 (having 13% mole ratio of crosslinkable functional group in the ethylene oxide elastomer) displayed a distorted and broken shape after swelling, as seen in FIG. 8. Even though there was no crosslinkable functional group in the ethylene oxide elastomer in the composition of Comparative Example 5, that sample (having an insufficient amount of only 10 parts of the ethylene oxide elastomer) showed remarkably low constrained swell in tap water over the duration of the test (14 days).

FIG. 8 shows that constrained swell shapes for the compositions of Example 6 and Example 7 had consistently good shape retention in tap water at 122° F. (50° C.) after 14 days. In contrast, the sample of Comparative Example 4 displayed broken shapes after swelling. The sample of Comparative Example 5 exhibited a negligible degree of constrained swell in tap water at 122° F. after 14 days.

Figure 9:
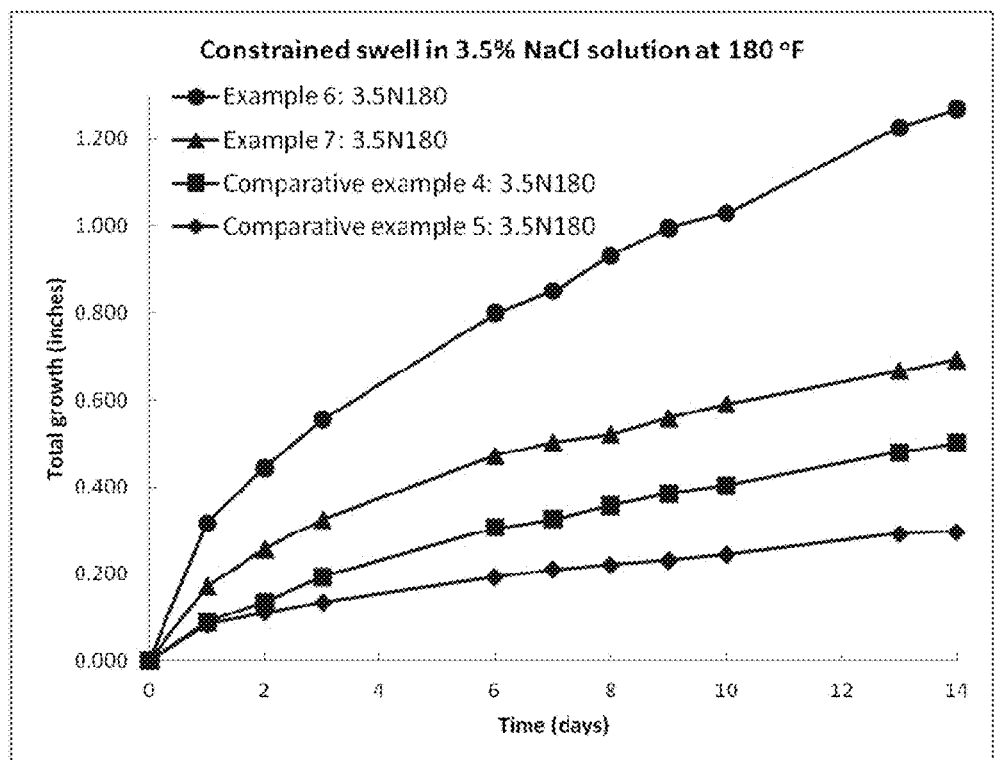
FIG. 9 is a graph of constrained swell over 14 days for the compositions of Example 6-Example 7 and Comparative Example 4-Comparative Example 5 in 3.5% NaCl solution at 180° F. (82° C.).
Figure 10:
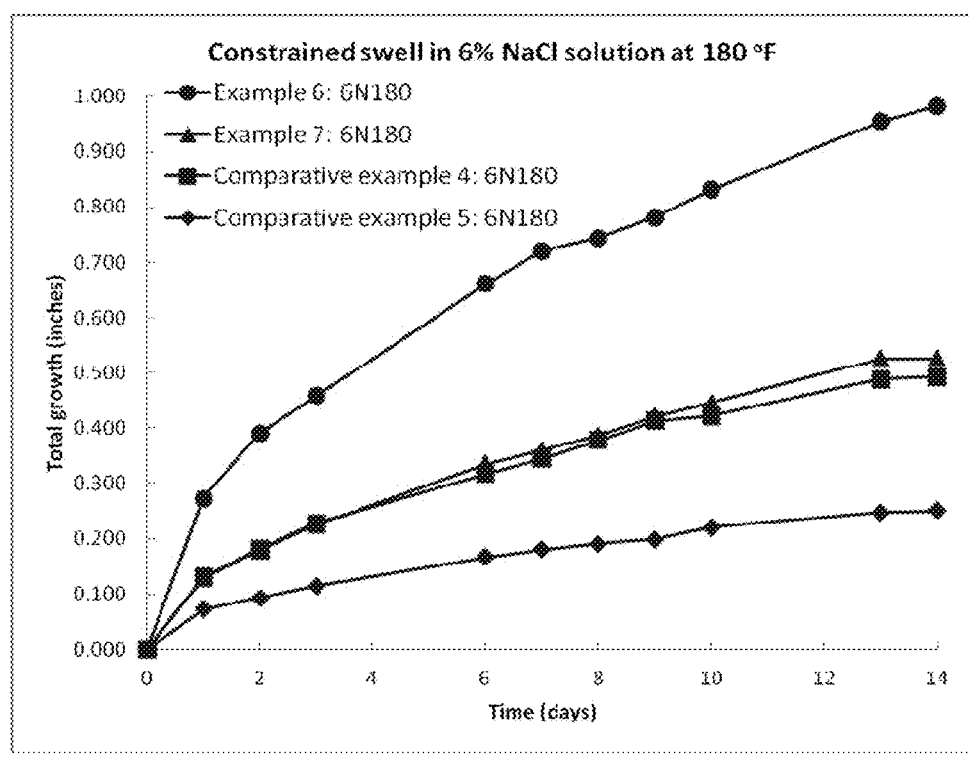
FIG. 10 is a graph of constrained swell over 14 days for the compositions of Example 6-Example 7 and Comparative Examples 4-Comparative Example 5 in 6% NaCl solution at 180° F. (82° C.).
Figure 11:
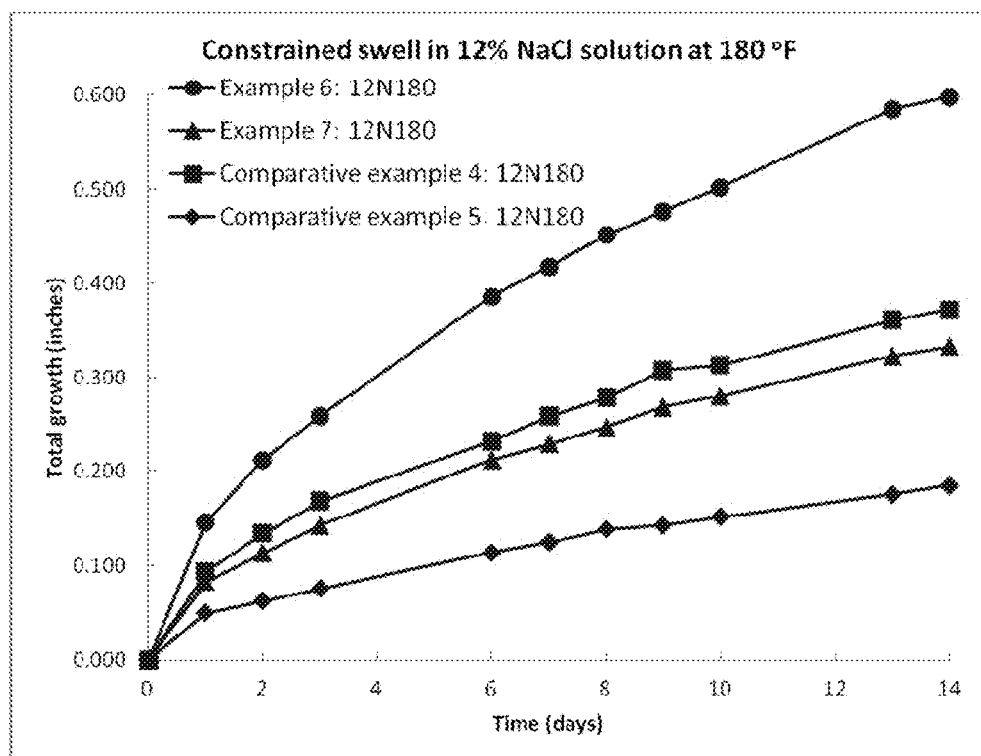
FIG. 11 is a graph of constrained swell over 14 days for the compositions of Example 6-Example 7 and Comparative Example 4-Comparative Example 5 in 12% NaCl solution at 180° F. (82° C.).

FIG. 9-FIG. 11 show the constrained swell of the tested compositions in different saline concentrations at 180° F. The absolute values of constrained swell changed with the saline concentration. However, the relative order of the amount of constrained swell for the four compositions did not change.

The water swellable rubber composition of the invention may be produced in various forms suitable for its end use, such as slabs, sheets, strips, tubes, pellets and crumbs. It can be produced also as a rope, a string, a tape, a slug, a powder, a slurry, or a dispersion for a paint or coating. The composition may be adapted to any other form or shape that allows it to be used to produce an article, or implement a step in a process which takes advantage of its high and sustained water swell characteristics.

An important aspect of the water swelling of the rubber composition of the invention which contains crosslinkable sites is that the swelling process is reversible. Swelling decreases when the rubber is no longer exposed to water and the absorbed water is released from the rubber. Eventually the rubber returns to a shape very close to its original shape.

The water swellable rubber composition of the invention may be formed into articles by various methods such as compression, transfer, extrusion, injection, and wrapping, and then cured. The composition also may be cured and then divided into smaller pieces for its end use. In a particular embodiment, the composition may be cured and then divided into pieces or particles of a size suitable for delivery by a fluid carrier to a space defined by solid walls under water. As the particles thus deposited in that space absorb water, expand in size and press against the walls surrounding the space, they eventually fill up the space and close it.

The water swellable rubber composition of the invention has excellent water swell characteristics under conditions of free contact surface and/or constrained geometry, under prolonged exposure to high temperature and to various electrolyte solutions (including high salinity as well as acid conditions). The composition is suitable for uses where such properties are advantageous, for example control and prevention of a fluid flow through a defined space, caulking, sealing, preserving airtightness in machinery or apparatus. As already mentioned above, the water swellable rubber composition is suitable as a sealing element for a well packer in well drilling. The water swellable rubber composition may also be made into a seal, a gasket, a component of a device for controlling fluid flow, a component of a device for detecting water by the swelling of the component, or a component for activating a mechanism in a control device after water is absorbed into the component and changes its shape. The rubber composition may also be used for toys and game elements.

In a particular application the rubber composition of the invention may be used for impeding or stopping an aqueous fluid flow through a space defined by solid walls by placing the rubber composition inside the space in contact with the aqueous fluid flow. As the rubber swells by absorption of water from the aqueous fluid, the expanding rubber fills up the space and presses against the walls, the flow of the aqueous fluid through the space is impeded and eventually stopped. This method may be used in spaces such as cavities or cracks defined by solid walls which may be smooth, or uneven, or even discontinuous in some areas. These cavities or cracks may be in natural formations in the environment, or may be in man made devices or installations.

The reversible aspect of the swelling by water of the rubber composition of the invention which contains crosslinking sites lends itself to additional applications and uses. For example, the rubber composition may be made into a part of a device for detecting water depletion when a indicator mechanism is activated when the part made from the rubber composition shrinks upon drying out and is no longer in contact with a portion of the device. A toy which operates on the basis of water swelling the rubber composition of the invention may be re-used since the swelling is reversible and the part made from the rubber composition returns to its original shape. The rubber composition of the invention may also be used for removing unwanted water from a material or an environment contaminated with such water, with possible reuse of the rubber composition after the swelling by water is reversed upon drying.

Other embodiments and uses of the present invention will be apparent to those skilled in the art from consideration of the specification and practice of the invention disclosed herein. It is intended that the specification and examples be considered as illustrative only, with the true scope and spirit of the invention being indicated by the following claims.

What is claimed is:

1. A water swellable rubber composition comprising:
   (a) a non-water swellable base rubber,
   (b) a combination of (i) an ethylene oxide based hydrophilic elastomer having at least 65 mole % of ethylene oxide and having no crosslinkable curable functional group, and (ii) an ethylene oxide based hydrophilic elastomer having at least 65 mole % of ethylene oxide and a crosslinkable curable functional group, wherein the combination has in total less than 5 mole % of a crosslinkable curable functional group, and
   (c) a water swellable non-elastomeric material which is at least one selected from the group consisting of sodium acetate, sodium formate, and sodium acrylate,
   wherein the composition comprises
   100 phr of the base rubber (a),
   50-200 phr of the combination of ethylene oxide based hydrophilic elastomers (b), and
   20-200 phr of the water-swellable non-elastomeric material (c).

2. A water swellable rubber composition according to claim 1, wherein the non-water swellable base rubber (a) is at least one selected from the group consisting of hydrogenated acrylonitrile-butadiene rubber (HNBR), epichlorohydrin rubber, acrylate rubber (ACM), acrylonitrile-butadiene rubber (NBR), chloroprene, ethylene-propylene-diene rubber (EPDM), and natural rubber.

3. A water swellable rubber composition according to claim 1, wherein the curable functional group in the ethylene oxide based hydrophilic elastomer (b)(ii) is at least one selected from the group consisting of hydroxyl, carboxyl, epoxy, amino, oxime, vinyl, oxazoline, anhydride, and amide.

4. A water swellable rubber composition according to claim 1, wherein the ethylene oxide based hydrophilic elastomer (b)(ii) is an ethylene oxide-propylene oxide-allyl glycidyl ether terpolymer having at least 75% mole ratio of ethylene oxide and 0.1-20% mole ratio of allyl glycidyl ether.

5. A water swellable rubber composition according to claim 1, wherein the ethylene oxide based hydrophilic elastomer (b)(i) is an ethylene oxide homopolymer.

6. A water swellable rubber composition according to claim 1, further comprising:
   (d) a compatibilizing agent.

7. A water swellable rubber composition according to claim 6, comprising:
   (d) up to 40 phr of the compatibilizing agent.

8. A water swellable rubber composition according to claim 6, wherein the compatibilizing agent is at least one selected from the group consisting of trioctyl trimellitate, ditridecyl adipate, and dialkyl diether glutarate.

9. A water swellable rubber composition according to claim 1, comprising a peroxide cure system or a sulfur cure system.

10. A water swellable rubber composition according to claim 9, comprising at least one accelerator for the cure system.

11. An article comprising the composition of claim 1.

12. An article according to claim 11, wherein the composition is cured.

13. An article according to claim 11, wherein the composition is uncured.

14. An article according to claim 11, which is a seal, a gasket, a component of a well packer, a component of a device for controlling fluid flow, a component of a device for detecting water, a component of a device for detecting depletion of water, a component for an activating mechanism in a control device, a toy, or a game element.

15. A method for impeding an aqueous fluid flow through a space defined by solid walls, comprising the steps of placing the composition of claim 1 in said space in contact with the aqueous fluid flow, whereby the composition swells by absorption of water from the aqueous fluid, fills up said space and impedes the flow of the aqueous fluid through the space.

16. A method as in claim 15, wherein the solid walls are smooth.

17. A method as in claim 15, wherein the solid walls have uneven surfaces or minor discontinuous areas.

* * * * *